United States Patent
Neyman

[11] Patent Number: 5,551,175
[45] Date of Patent: Sep. 3, 1996

[54] REMOVING LINT FROM FLATWORK IRONER TEMPERATURE SENSORS

[76] Inventor: Joseph H. Neyman, 3301 W. Coquelin Ter., Chevy Chase, Md. 20815

[21] Appl. No.: 324,202

[22] Filed: Oct. 17, 1994

[51] Int. Cl.⁶ .......................... D06F 65/10; G01K 13/08; B08B 5/02
[52] U.S. Cl. ................. 38/44; 38/49; 374/153; 15/316.1
[58] Field of Search ................. 38/1 R, 44, 49, 38/51, 11; 15/316.1, 319; 26/298; 374/125, 153, 154

[56] References Cited

U.S. PATENT DOCUMENTS

| | | | |
|---|---|---|---|
| 1,605,027 | 11/1926 | Himes | 38/49 X |
| 1,840,116 | 1/1932 | Linton et al. | 15/316 R |
| 2,362,947 | 11/1944 | Sullivan | 38/49 X |
| 2,825,156 | 3/1958 | Kinzelman | 38/44 |
| 3,934,477 | 1/1976 | Thettu | 374/153 X |
| 4,411,706 | 10/1983 | Wallace et al. | 15/301 |
| 4,501,504 | 2/1985 | Urmenyi et al. | 374/153 X |
| 4,674,718 | 6/1987 | Björklund | 15/301 |
| 5,245,601 | 9/1993 | Hake | 15/316.1 |

OTHER PUBLICATIONS

Chicago Dryer Company, Instruction Manual for Flatwork Ironers, Apr. 22, 1988, Pub. No. 7134 (11 pages).

*Primary Examiner*—Ismael Izaguirre

[57] ABSTRACT

Pressurized air is received from a supply source through a timed air valve and is conducted by fixedly mounted copper tubing to locations adjacent flatwork ironer temperature sensors. The tubing directs the intermittent timed bursts of air onto the interfaces between the sensors and rotating heated cylinders to remove lint buildups. A manual override switch is wired in parallel with the timer to allow additional bursts of air at operator discretion.

18 Claims, 2 Drawing Sheets

REMOVING LINT FROM FLATWORK IRONER TEMPERATURE SENSORS

BACKGROUND OF THE INVENTION

1. Field of the Invention

The present invention relates to temperature sensors for heated rollers in sheet conveyors and, more particularly, to the prevention of lint buildup on heat sensors attached to flatwork ironers.

2. Description of the Prior Art

Flatwork ironers are widely used in laundries for hotels, hospitals, restaurants and related institutions to dry and iron linen items such as sheets, pillowcases, tablecloths, towels, napkins, etc. In a typical embodiment damp flatwork is fed onto canvas conveyor ribbons and transported under compression rollers for initial stretching, smoothing and flattening, then between return ribbons and an upper rotating cylinder or roller, generally gas heated, where the adjacent side of the flatwork is dried and further pressed. The fabric is then conveyed to a second heated rotating cylinder where the opposite side of the material is dried and pressed. The flatwork is transported by the return ribbons at a speed slightly faster than the rotating speed of the heated cylinders to produce a sliding contact that produces calendared or glossy finish on the ironed flatwork.

Temperatures up to nearly 400° F. and transport speeds of up to about 150 feet per second pose severe safety hazards to operating personnel. As a consequence flatwork ironer components are arranged to displace the dangerous heated rotating cylinders to locations remote from operator interaction. In addition guards and shrouds are placed around the equipment to prevent or discourage accidental insertion of hands and arms into proximity with the heated cylinders.

Because different fabric requirements and production rates demand selective temperature control, sensors are mounted against each of the heated cylinders to provide continual temperature monitoring, and additional high temperature limit switches are also mounted against each heated cylinder to automatically shut down the heater when excessive temperature is sensed, to prevent scorching of flatwork or burning of the return ribbons.

Both the heat monitor/control switch and the limit switch typically have brass shoes spring-loaded to press against a portion of the rotating cylinder surface not in contact with the flatwork.

The nature of flatwork ironing produces a great deal of lint requiring frequent removal to prevent buildups of lint around the brass sensor shoes and between the shoes and the heated cylinders. Such lint insulates and compromises the temperature sensitivity of the sensors and can produce dangerously misleading low temperature readings.

Suggested maintenance procedures include blowing lint buildups away from sensors using hand held compressed air lines before each daily startup of operation while the cylinders are cool and belts are not turning. Unfortunately, lint buildups occur more quickly and more often than can be corrected once a day, and even daily maintenance is sometimes omitted due to the pressure of busy production schedules. In other words, ironer downtime while cylinders cool to safe levels is frequently intolerable and, as a result, operators resort to short-cutting or ignoring entirely the prescribed safety procedures. Scraping tools jury-rigged to broom handles, for one example, are inserted into the operating ironer to pry lint from around clogged sensors while the ironers continue to operate, posing a serious hazard to burns and potential entanglement with moving belts. Moreover, damage to the cylinder, shoes, and particularly to the electrical leads and solder joints is risked each time cleaning of this type occurs. The alternatives, shutting down the machine for an extended period, or allowing lint deposits to compromise temperature sensing, have unacceptable commercial consequences in many instances.

Although the use of directed air flow as a dust removal mechanism is known in apparatus such as optical recorders, for example U.S. Pat. No. 5,245,601 (Hake), railway switches, U.S. Pat. No. 4,674,718 (Bjorklund), electrical contacts, U.S. Pat. No. 1,840,116 (Linton et al) and ink jet printers, U.S. Pat. No. 4,411,706 (Wallace et al), no one has heretofore proposed automatically and safely maintaining heat sensors lint-free in a hostile flatwork ironer operating environment.

OBJECTS AND SUMMARY OF THE INVENTION

Accordingly, it is a primary object of the present invention to provide a method and apparatus for safely maintaining the heat sensors of flatwork ironers free of lint buildups without requiring shutdown of the ironer.

Another object of the present invention is to reduce the likelihood of fire resulting from undetected over heating ironers.

It is a further object of the present invention to minimize the unproductive downtime of flatwork ironers necessitated by the need to remove dangerous lint buildups on heat sensors without any risk of injury to operators.

It is yet another object of the present invention to continuously maintain substantially lint free temperature sensors without scraping or otherwise impacting the sensors or heated rotating cylinders of flatwork ironers.

It is still another object of the present invention to provide a method and apparatus for maintaining safe accurate heat sensors on flatwork ironers that can be simply retrofit onto existing equipment.

The aforesaid objects are achieved individually and in combination and it is not intended that the invention be construed as requiring that two or more of said objects be combined.

In accordance with the present invention, pressurized air is periodically or selectively directed at a heat sensor during normal operation of the flatwork ironer to remove any accumulated lint. In the preferred embodiment air from any conventional pressure source is supplied through timed automatic or manually switched solenoid valves to copper air tubing mounted near heat sensors that are spring-mounted against the heated rotating cylinders of the flatwork ironers. The copper tubing issues the pressurized air toward the sensor-cylinder interface to blow away the collected lint.

The present invention provides an inexpensive, easily installed and retrofit method and apparatus for maintaining the accuracy of flatwork ironer heat sensors while protecting both the operators and the equipment from accidental harm and without interrupting the work production of the machine.

The above and still further objects, features and advantages of the present invention will become apparent upon considering the following detailed description of preferred embodiments thereof, particularly when viewed in connection with the accompanying drawings wherein like reference

DESCRIPTION OF THE PREFERRED EMBODIMENTS

Figure 1:
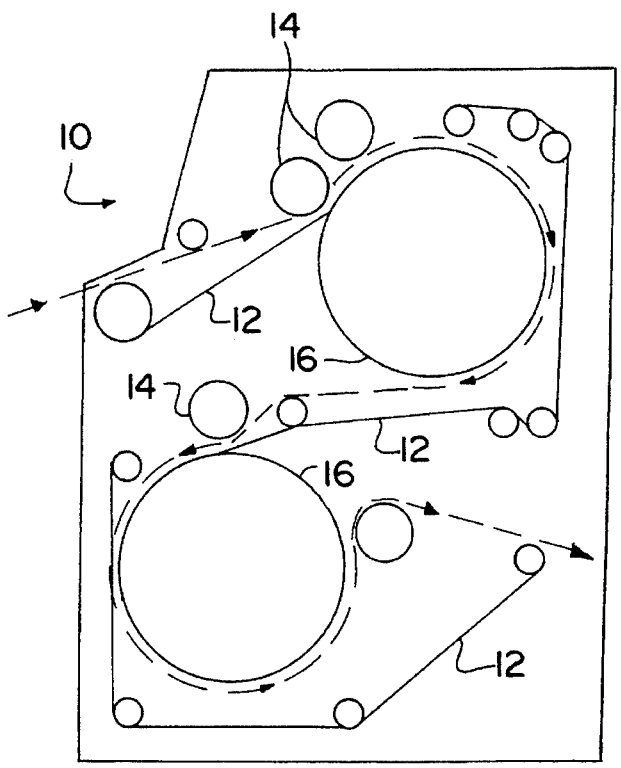
FIG. 1 is a diagram showing the path of flatwork through a typical flatwork ironer.
Figure 2:
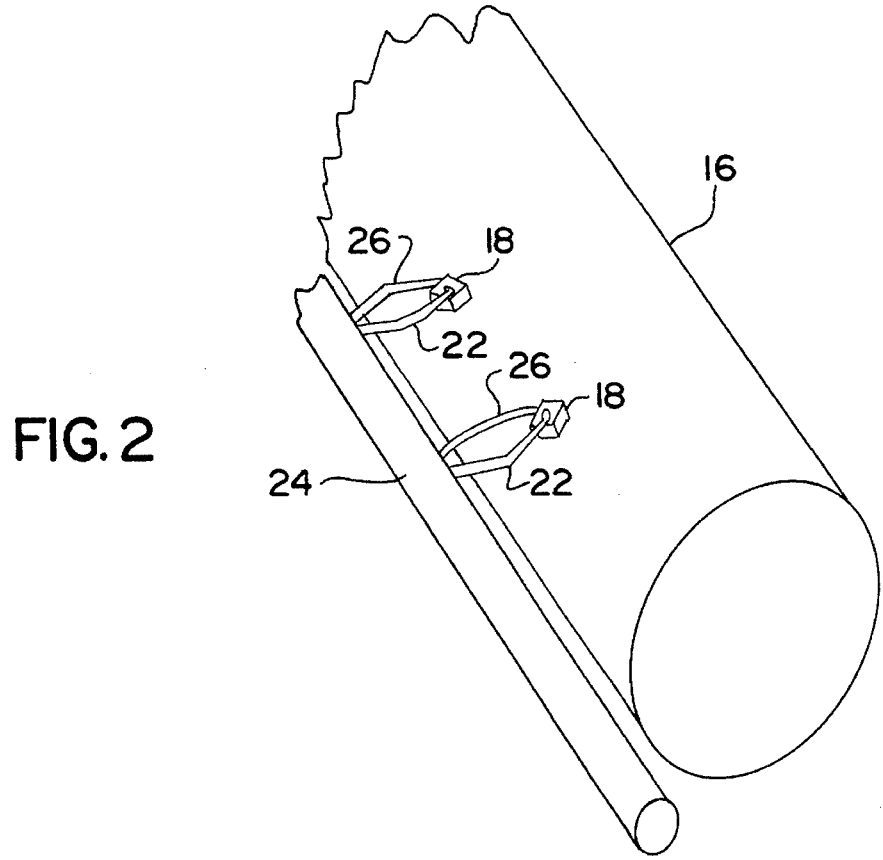
FIG. 2 is a broken prospective view of heat sensors spring mounted from a bracket against a rotating cylinder.

Referring to FIG. 1, the path of flat linens through a twin cylinder mangle, or flatwork ironer 10 is shown as a dashed line. Conveyor ribbons 12 transport the moist linen articles under compression rolls 14 and partially around each of two usually gas-fire heated rotating cylinders 16 for drying and pressing, then out of the ironer for subsequent folding. Maintenance of heated cylinder temperature is critical inasmuch as insufficient heat will produce damp unfinished output laundry and excessive heat can cause scorching, damage to ironer components and fire and safety hazards. Two heat sensors 18, shown in FIG. 2, include brass contact shoes 20 held in sliding contact against either or both cylinders 16 by spring mounts 22 extending from a mounting bracket 24. Thermocouple wires 26 carry temperature related signals to remotely installed temperature control and emergency shut-off switches. One of the temperature sensors provides a temperature feedback to the operator to adjust the heat generated within the cylinder to the requirements of the ironing process; the other is a temperature fuse set to cut off the heat when a preselected maximum safe operating temperature is sensed.

The repetitious sliding friction exerted on the processed cloth articles by the stretching and sliding of the material over the drums, rollers and ribbons produces a large and steady supply of lint, much of which collects on and near sensors 18 and between sensors 18 and cylinders 16 forming an insulating barrier and heat sink tending to produce misleadingly low temperature values.

Figure 3:
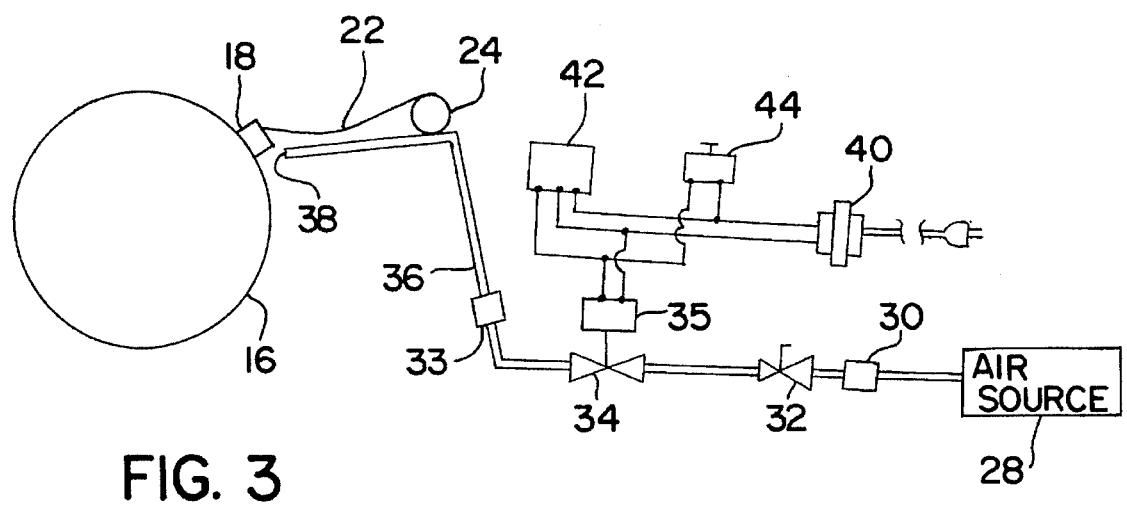
FIG. 3 is a schematic diagram of the pressurized air flow path to a heat sensor spring mounted to a heated revolving flatwork ironer cylinder according to the present invention.

In one embodiment of the present invention, shown schematically in FIG. 3, pressurized air, supplied from a compressor, pre-existing pneumatic lines or any reliable convenient source 28, communicates through a regulator 30 and shut-off valve 32 with a solenoid valve 34. Valve 34 is connected via one or more compression unions 33 to a copper air tube 36 extending to a position adjacent heat sensor 18, the open distal end 38 of tube 36 being directed toward the interface between the sensor 18 and the cylinder 16. The solenoid valve coil 35 is energized by convenience line current stepped down to 24 volts a.c. by transformer 40. A selectably programmable timer 42, energized whenever transformer 40 is activated, allows the operator to select the intervals between and durations of solenoid activation and consequent air flow through tube 36. A separate manual override switch 44 is wired in parallel with the timer and permits the operator to activate the solenoid at any time.

Copper tube 36 is conveniently mounted on sensor bracket 24, and timer 42 and override switch 44 can be located within sight of the sensor-cylinder interface but beyond harms way. Any number of solenoid valves 34 can be manifolded to separately control pressurized air flow from source 28 to as many temperature sensors of both types (i.e., feedback and fuse) as required, or all of the lines can be activated together through a single solenoid.

In use the operator sets the timer to periodically activate the solenoid valve at intervals consistent with the lint buildup based on experience and ironer production rates and for durations required to dislodge and clean lint buildups. In practice, intervals in the one-half to one hour range and durations of one to three seconds are applicable for normal production using a manifold pressure in the range of 100 psi. The transformer becomes energized when power is supplied to the ironer, and starts the timing cycle and each time the solenoid is activated by the timer a burst of pressurized air is directed into the sensor-cylinder interface to clear away accumulated lint. As circumstances dictate, the operator can direct additional air flow to the sensor-cylinder interface by activating override switch 44.

From the foregoing description, it will be appreciated that the invention makes available a novel method and apparatus for preventing lint buildup and thereby providing the ability of temperature feedback control and heat limit sensors to accurately monitor the operating temperatures on the heated rotating cylinders of flatwork ironers. Safety of operating personnel is improved because lint deposits are removed by remote control and efficiency is raised because the ironer need not be shut down and cooled to accomplish such cleaning.

Having described preferred embodiments of the heat sensor lint cleaner, it is believed that other modifications, variations and changes will be suggested to those skilled in the art in view of teachings set forth herein. It is therefore to be understood that all such variations, modifications and changes are properly within the scope of the present invention as defined by the appended claims.

I claim:

1. An apparatus for automatically removing lint buildups from around a flatwork ironer temperature sensor mounted on a bracket adjacent a heated rotating cylinder comprising:

a source of compressed pressurized air;

a conduit for receiving said pressurized air from said source, said conduit fixedly mounted adjacent the sensor for directing said pressurized air onto the temperature sensor;

air valve means interposed between said pressurized air source and the sensor; and selectably controllable means for intermittently opening and closing said air valve means to control the flow of pressurized air through said conduit and onto the sensor to remove lint buildup.

2. The apparatus of claim 1 further comprising a timer switch for automatically controlling the duration of streams of pressurized air flow onto said sensor and the duration of intervals between said streams.

3. The apparatus of claim 1 wherein said valve is a solenoid valve.

4. The apparatus of claim 1 wherein said conduit is copper tubing.

5. The apparatus of claim 1 wherein said air valve means is remotely located from said heated rotating cylinder to assure operator safety.

6. The apparatus of claim 1 wherein said conduit is fixedly mounted on the temperature sensor bracket.

7. An apparatus for automatically, remotely and continuously removing lint buildup from around at least one flatwork ironer temperature sensor mounted adjacent heated rotating cylinder comprising:

a source of pressurized air;

conduit for receiving said pressurized air from said source and directing said pressurized air onto each of at least one temperature sensor, said conduit means fixably mounted to direct a stream of said pressurized air on said at least one sensor;

at least one solenoid valve interposed between said air source and said conduit means, said at least one solenoid valve preventing air flow when not activated and allowing air flow when activated;

a timer switch selectably programmable to control the durations of said solenoid valve activations and the intervals between said activations; and a manually operated switch in parallel with said timer switch to allow selective solenoid valve activation in addition to said timer controlled activations.

8. The method of automatically and periodically removing lint from flatwork ironer temperature sensors comprising the steps of:

(a) receiving a flow of compressed pressurized air through a valve and into a fixedly mounted conduit for directing said flow of air onto said temperature sensors;

(b) controlling the frequency and duration of said flow of pressurized air by opening and closing said valve; and (c) operating said valve with a selectably programmable timer to produce intermittent lint removing bursts of pressurized air.

9. The method of automatically removing lint from flatwork ironer temperature sensors without interrupting the normal transport of linen items over the heated rotating cylinders comprising the steps of:

(a) receiving a flow of compressed pressurized air through a control valve remotely located from said cylinders;

(b) transmitting said flow through said valve into a fixedly mounted conduit for directing said flow onto the temperature sensors; and (c) selectably controlling the frequency and duration of said flow onto the sensors, to dislodge collected lint by opening and closing said valve.

10. The method of claim 9 further comprising the step of:

(d) operating said valve with a selectably programmable timer to produce intermittent lint removing bursts of pressurized air onto said temperature sensors.

11. An apparatus for automatically removing lint buildups from around a flatwork ironer temperature sensor mounted on a bracket adjacent a heated rotating cylinder comprising:

a source of pressurized air;

a conduit for receiving said pressurized air from said source and fixedly mounted adjacent the sensor for directing said pressurized air onto the temperature sensor;

a controllable air valve interposed between said pressurized air source and said directing means for intermittently controlling the flow of pressurized air through said conduit and the said sensor; and a manual override switch for energizing said controllable air valve.

12. The apparatus of claim 11 further comprising a timer switch and a manual override switch for energizing said air valve, said timer switch and said override switch being wired in parallel.

13. The apparatus of claim 11 further comprising an air shut off valve interposed between said air source and said air valve.

14. The apparatus of claim 11 further comprising a transformer for stepping line current to 24 volts for operating said air switch.

15. The method of automatically and periodically removing lint from flatwork ironer temperature sensors comprising the steps of:

(a) receiving a flow of pressurized air through a valve and into a fixedly mounted conduit for directing said flow of air onto the temperature sensors;

(b) controlling the frequency and duration of said flow of pressurized air by opening and closing said valve;

(c) operating said valve with a selectably programmable timer to produce intermittent lint removing bursts of pressurized air; and (d) augmenting the periodically timed flow of pressurized air to provide additional lint removal on demand by manually activating said valve with an override switch wired in parallel with said timer.

16. The method of automatically removing lint from flatwork ironer temperature sensors without interrupting the normal transport of linen items over the heated rotating cylinders comprising the steps of:

(a) receiving a flow of pressurized air through a control valve remotely located from said cylinders, wherein said pressurized air has pressure about 100 psi;

(b) transmitting said flow through said valve into a fixedly mounted conduit for directing said flow onto the temperature sensors;

(c) controlling the frequency and duration of said flow onto the sensors by opening and closing said valve; and (d) operating said valve with a selectably programmable timer to produce intermittent lint removing bursts of pressurized air onto the temperature sensors.

17. The method of claim 16 wherein said frequency of said flow onto the sensors is about once each half hour of ironer operation.

18. The method of claim 16 wherein said duration of said flow onto the sensors is about two seconds.

* * * * *